United States Patent
Hirsch et al.

(10) Patent No.: US 9,553,345 B2
(45) Date of Patent: Jan. 24, 2017

(54) HEAT EXCHANGER

(71) Applicant: Behr GmbH & Co. KG, Stuttgart (DE)

(72) Inventors: Stefan Hirsch, Stuttgart (DE); Heiko Neff, Auenwald (DE); Martin Engelhardt, Ditzingen (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 490 days.

(21) Appl. No.: 13/920,121

(22) Filed: Jun. 18, 2013

(65) Prior Publication Data

US 2013/0333869 A1 Dec. 19, 2013

(30) Foreign Application Priority Data

Jun. 19, 2012 (DE) .......... 10 2012 210 339

(51) Int. Cl.
| | |
|---|---|
| *F28F 9/04* | (2006.01) |
| *F28F 1/20* | (2006.01) |
| *H01M 8/04* | (2016.01) |
| *H01M 10/6556* | (2014.01) |
| *H01M 10/613* | (2014.01) |
| *F28F 9/02* | (2006.01) |

(Continued)

(52) U.S. Cl.
CPC ...... *H01M 10/5004* (2013.01); *F28D 1/05366* (2013.01); *F28F 9/0224* (2013.01); *F28F 9/18* (2013.01); *H01M 8/04074* (2013.01); *H01M 10/613* (2015.04); *H01M 10/6556* (2015.04)

(58) Field of Classification Search
CPC .............. F28F 9/0224; F28F 9/16; F28F 1/30; F28D 2021/0043; H01M 8/04074; H01M 10/6556

USPC .................. 165/173, 175, 171, 178; 429/120
See application file for complete search history.

(56) References Cited

U.S. PATENT DOCUMENTS

| | | | | |
|---|---|---|---|---|
| 2,521,475 A | * | 9/1950 | Nickolas ................. | F25B 39/02 165/175 |
| 3,245,465 A | * | 4/1966 | Young ...................... | F28F 1/32 165/173 |

(Continued)

FOREIGN PATENT DOCUMENTS

| | | |
|---|---|---|
| CH | 661 464 A5 | 7/1987 |
| DE | 10 2008 033594 A1 | 2/2009 |

(Continued)

OTHER PUBLICATIONS

European Search Report, Appl. No. 13170660.8-1602, Oct. 22, 2013, 5 pgs.

(Continued)

*Primary Examiner* — Leonard R Leo
(74) *Attorney, Agent, or Firm* — Paul D. Strain, Esq.; Strain & Strain PLLC

(57) ABSTRACT

The invention relates to a heat exchanger, in particular for controlling the temperature of batteries or electronics, having at least one header with a bottom and a top, with openings which are provided in the bottom for receiving tube ends of tubes which are in fluidic communication with the headers, the headers being formed from a U-shaped element with two parallel limbs and a bottom region which connects the limbs, the openings being provided in the bottom region and a wall region which is introduced between the limbs being provided as top.

14 Claims, 6 Drawing Sheets

(51) Int. Cl.
*F28F 9/18* (2006.01)
*F28D 1/053* (2006.01)

(56) References Cited

U.S. PATENT DOCUMENTS

| | | | | |
|---|---|---|---|---|
| 4,722,387 | A * | 2/1988 | Aurand | F28F 9/18 |
| | | | | 165/173 |
| 4,945,635 | A * | 8/1990 | Nobusue | B21C 37/06 |
| | | | | 165/173 |
| 5,228,512 | A * | 7/1993 | Bretl | F28F 9/18 |
| | | | | 165/173 |
| 5,570,737 | A * | 11/1996 | Tokutake | F28D 1/0535 |
| | | | | 165/67 |
| 5,622,220 | A | 4/1997 | Park et al. | |
| 5,881,456 | A * | 3/1999 | Bergins | B21D 53/02 |
| | | | | 165/175 |
| 6,462,949 | B1 * | 10/2002 | Parish, IV | F28D 15/0266 |
| | | | | 165/80.4 |
| 7,201,218 | B2 * | 4/2007 | Hiyama | F28F 9/0224 |
| | | | | 165/173 |
| 7,461,689 | B2 * | 12/2008 | Merklein | F28D 1/05366 |
| | | | | 165/173 |
| 8,851,157 | B2 * | 10/2014 | Falkingham | F28F 9/04 |
| | | | | 165/173 |
| 2001/0017201 | A1 * | 8/2001 | Avequin | F28F 9/0224 |
| | | | | 165/173 |
| 2006/0048930 | A1 | 3/2006 | Ozaki et al. | |
| 2007/0240867 | A1 * | 10/2007 | Amano | F28F 3/12 |
| | | | | 165/168 |
| 2014/0090812 | A1 * | 4/2014 | Schmid | F28F 1/00 |
| | | | | 165/104.19 |

FOREIGN PATENT DOCUMENTS

| | | |
|---|---|---|
| DE | 10 2011 005 236 A1 | 9/2012 |
| EP | 1 795 853 A1 | 6/2007 |
| FR | 2 504 667 A1 | 10/1982 |
| WO | WO 02/081998 A1 | 10/2002 |
| WO | WO 2007/048889 A1 | 5/2007 |

OTHER PUBLICATIONS

German Search Report, DE 10 2012 210 339.2, Apr. 19, 2013, 5 pgs.

* cited by examiner

HEAT EXCHANGER

CROSS-REFERENCE TO RELATED PATENT APPLICATIONS

This application is based upon and claims the benefit of priority from prior German Patent Application No. DE 10 2012 210 339.2, filed Jun. 19, 2012, the entire contents of which are incorporated herein by reference in their entirety.

TECHNICAL FIELD

The invention relates to a heat exchanger, in particular a radiator for batteries or electronic components, in particular for motor vehicles.

PRIOR ART

Batteries are used more and more frequently in motor vehicles and also in other applications. During operation of the batteries, waste heat is generated here on account of the thermal losses on account of the processes within the battery itself. This necessarily leads to heating of the battery.

The Li-ion batteries which are currently in favor here have a temperature dependence, insofar as the battery cells age considerably more rapidly above a design-dependent temperature limit, so that the service life of the battery drops considerably as a result, which is not acceptable given the current prices for batteries of this type.

It is therefore decisive for batteries of this type to dissipate the thermal losses of the battery, in order for it not to be necessary to permit any excessive temperatures of the battery.

Furthermore, said batteries have the disadvantage at low temperatures that their capacity is likewise restricted. In situations of this type, heating of the battery to an elevated temperature would be desirable.

To this end, heat exchangers are used nowadays, as have been disclosed, for example, by the older application from the applicant DE 10 2011 005 236. However, heat exchangers of this type still have disadvantages with regard to their size, because they are of relatively high design and therefore require more installation space than is to be made available for this purpose in many applications.

SUMMARY OF THE INVENTION, PROBLEM, SOLUTION, ADVANTAGES

It is the problem of the invention to provide a heat exchanger of the type stated at the outset, which heat exchanger has a low overall height and nevertheless can be produced simply and inexpensively.

This is achieved by way of the features of claim 1.

One exemplary embodiment of the invention provides a heat exchanger, in particular for controlling the temperature of batteries or electronics, having at least one header with a bottom and a top, with openings which are provided in the bottom for receiving tube ends of tubes which are in fluidic communication with the headers, the headers being formed from a U-shaped element with two parallel limbs and a bottom region which connects the limbs, the openings being provided between the bottom region and a wall region which is introduced between the limbs being provided as top. As a result, a flat design can be realized and nevertheless an efficient design can be provided with a low coolant-side or refrigerant-side pressure drop in the header. The tubes are advantageously received in a sealed manner in openings of headers at their two ends which lie opposite one another. If only one header is used, there can be, for example, a deflection in the tube or the tube can be deflected or bent over in its entirety.

It is advantageous, in particular, if the height of the openings perpendicularly with respect to the plane of the limbs corresponds substantially to the spacing of the limbs on their inner side. As a result, a particularly flat design is achieved. If flat tubes are used and they are arranged with their flat side parallel to the limbs, a particularly flat overall design is realized.

It is advantageous if the limbs have a solder plating which is applied on the surface of the inner side of the limbs.

This is achieved by virtue of the fact that the soldering of the outer face of the flat sides of the flat tubes or the sides of the tubes which lie directly opposite the limbs are soldered to the limbs. This increases the stability of the header and, as a result, can lead to a reduction in the material thickness in the region of the wall thickness of the header.

It is also advantageous here if the tube end, preferably on the flat sides, of at least one tube or all tubes is soldered to the two limbs of the bottom which lie opposite one another.

Furthermore, it is advantageous if the top is formed by a solid metal part which is preferably rectangular in cross section.

It is also expedient if the tubes are formed as flat tubes with flat sides, the extent of the tubes in a plane parallel to the plane of the limbs of the bottom being greater than in a plane which is perpendicular with respect thereto, in particular being from 3 times to 12 times greater.

According to a further advantageous exemplary embodiment, it is expedient if a plurality of flat tubes are arranged next to one another, and a plate is placed onto the flat sides of the flat tubes and is connected to the flat tubes.

It is advantageous if the extent of the plate in a direction perpendicular with respect to the plane of the limbs corresponds substantially to the extent of the limbs in said direction.

It is also expedient if, on its outer side, the bottom has rim holes in the bottom region.

It is expedient here if the rim holes reach beyond the flat sides of the flat tubes. As a result, a stable soldered connection between the tube and the header can be achieved on the outer side of the header.

Further advantageous refinements are described by the following description of the figures and by the subclaims.

BRIEF DESCRIPTION OF THE DRAWINGS

In the following text, the invention will be explained in greater detail on the basis of at least one exemplary embodiment using the drawings, in which.

PREFERRED EMBODIMENT OF THE INVENTION

Figure 1:
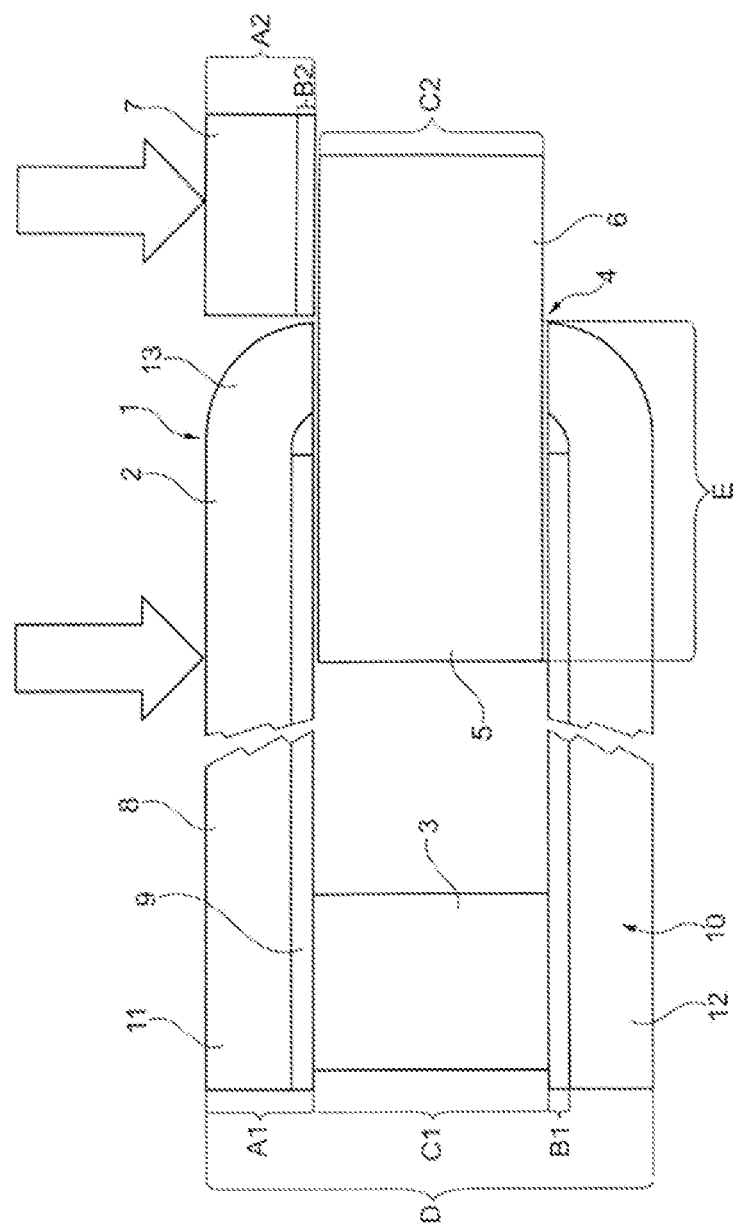
FIG. 1 shows a diagrammatic view of a header of a heat exchanger with a tube which is introduced into an opening.

FIG. 1 diagrammatically shows a header 1 of a heat exchanger, the header 1 comprising a bottom 2 and a top 3. In the bottom 2, the header 1 has openings 4, into which tube ends 5 of tubes 6 are inserted and are connected in a sealed manner. The tubes 6 are in fluidic communication with the headers 2. Furthermore, a plate 7 is placed as top plate on the tubes 6.

The bottom 2 of the header 1 is of U-shaped design, the bottom 2 having a core material 8 which is provided with a solder plating 9, the solder plating being applied on the inner side of the U-shaped bottom 2. The top 3 is received at the open end region 10 of the bottom 2 between the two limbs 11, 12 which lie opposite one another and define the bottom 2 together with the bottom region 13. The two limbs 11, 12 are connected by a connecting bottom region 13.

The spacing between the two limbs 11, 12 corresponds substantially to the extent C2 of the tube 6 or C1 of the top 3 in said direction.

Here, the thickness of the wall thickness of the header 3 is composed of a thickness of the core material 8 plus the thickness B1 of the solder plating.

The overall height of the header 1 perpendicularly with respect to the plane of the limbs 11, 12, denoted as D in FIG. 1, corresponds to the sum of twice A1 plus C1 or plus C2.

The tube 6 is pushed into the opening 4 and is pushed in the process by a distance with the magnitude E into the header. The magnitude E is longer than the wall thickness A1 of the header, with the result that the tube 6 also has an extent along the inner wall of the limbs 11, 12, with the result that the tube 6 is also soldered to the limbs 11, 12 in its region 5.

Figure 2:
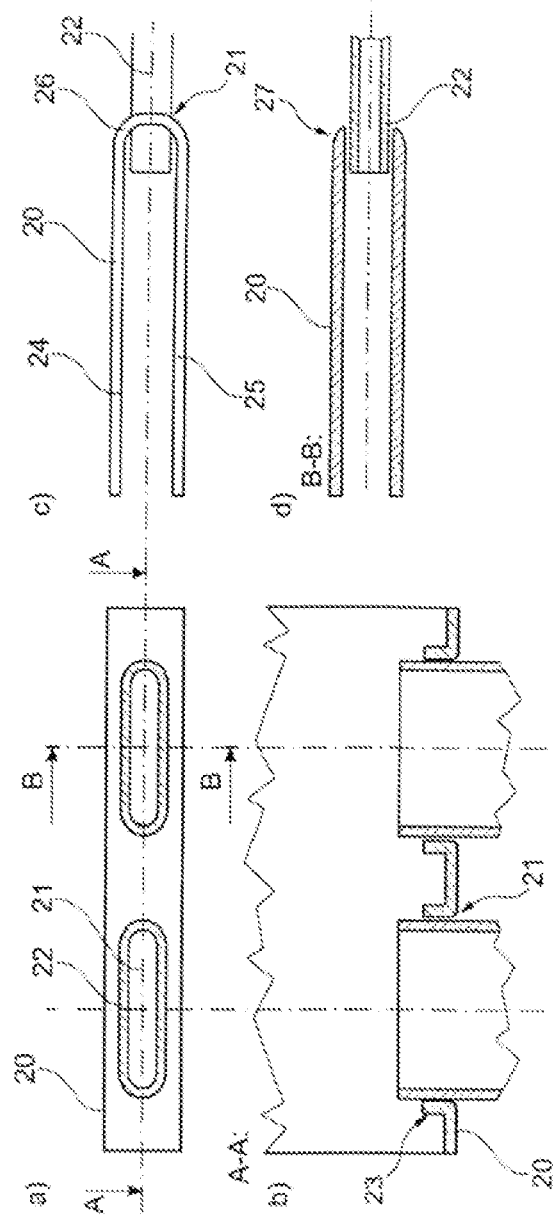
FIG. 2 shows, in part figures a), b), c) and d), in each case part views of the header.

FIG. 2a shows a detail of a header 20 with openings 21, into which a tube 22 is introduced.

FIG. 2b shows a section of the header according to the line A-A of FIG. 2a. It can be seen that, at the edge of the openings 21, the header 20 has rim holes 23 which bear against the short faces of the headers in order to achieve improved soldering.

FIG. 2c shows the header from FIG. 2a in cross section. It can be seen here that the header 20 is formed substantially from two limbs 24, 25 and a connecting region 26, the openings 21 being provided in the connecting region 26, through which openings 21 the tube 22 is introduced into the header 20.

FIG. 2d shows a section through the header 20 according to the line B-B of FIG. 2a. It can be seen that, at its front end region 27, the header 20 has outwardly deformed rim holes which are in lateral contact with the end region of the tube 22. As a result, improved soldering is achieved.

Figure 3:
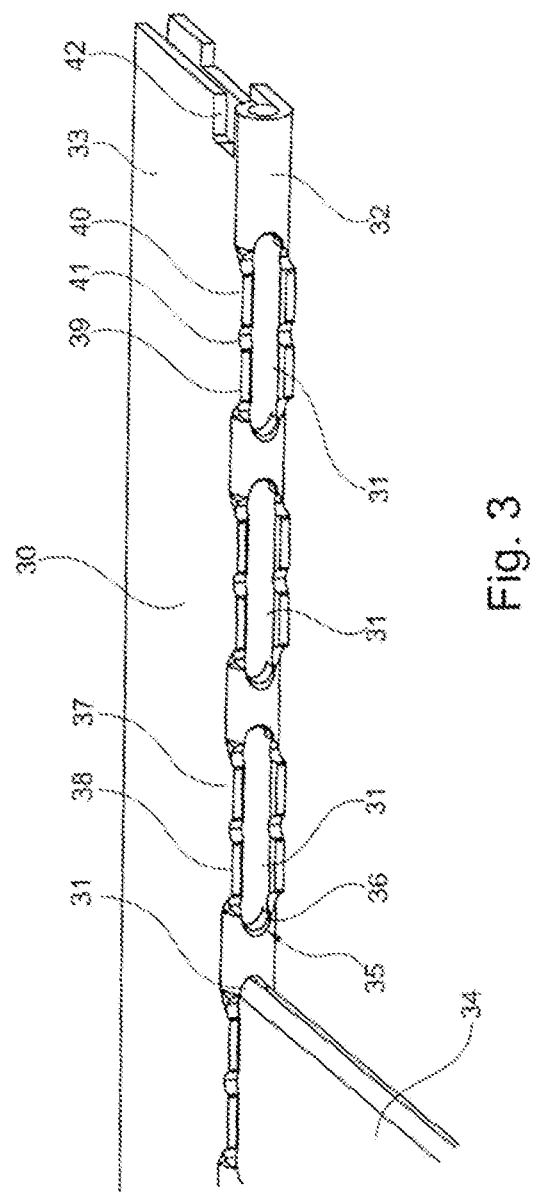
FIG. 3 shows a three-dimensional view of a header.

FIG. 3 shows a further exemplary embodiment of a header 30, into which openings 31 are made in the bottom region 32 of the tube bottom 33. It can be seen on the left-hand side of FIG. 3 that a flat tube 34 is introduced into an opening 31 of this type. Furthermore, it can be seen that there are inwardly positioned rim holes 36 on the narrow sides 35 of the openings 31, which rim holes 36 are formed substantially in the lateral round region on the narrow sides of the openings 31.

Rim holes 38 which are outwardly positioned are provided along the longitudinal sides 37 of the openings 31, said rim holes 38 being configured in such a way that they have two parts, a first part 39 and a second part 40, an indentation 41 dividing the two parts of the rim hole. The indentation serves to receive bulges of a top plate. As an alternative, the header can also be provided with a bulge; the top plate would then advantageously have indentations, in order to receive the bulges.

The outwardly positioned rim holes 38 are preferably provided both on the top and on the bottom side of the openings 31.

Moreover, it can be seen laterally of the header 30 that a notch or a cutout 42 is provided, for the positively locking connection of the top to the bottom or a lateral termination for terminating the header in the lateral direction.

Figure 4:
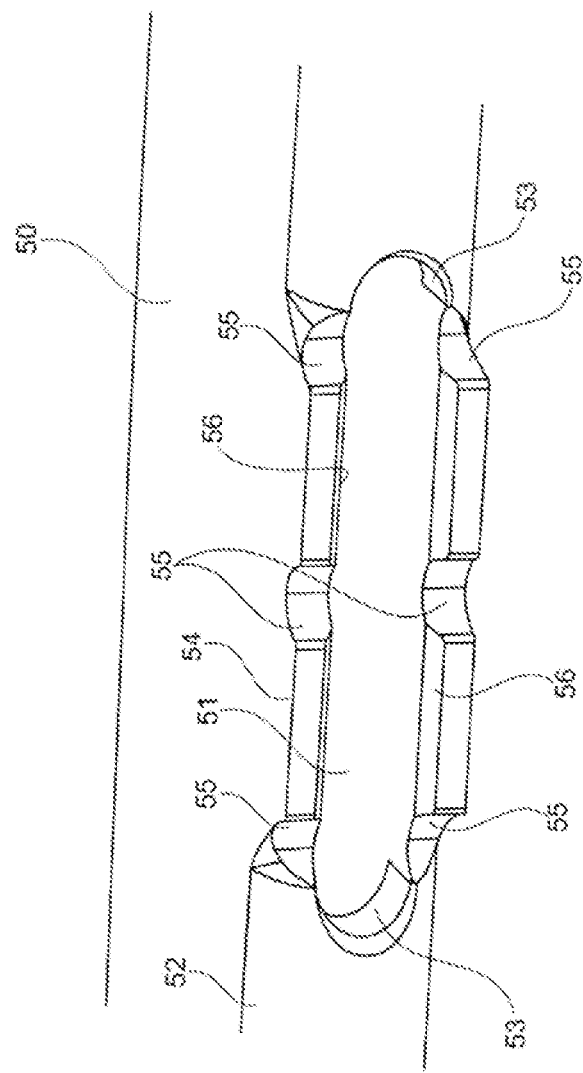
FIG. 4 shows an enlarged view of part of a header.

FIG. 4 shows a detail of a header 50 in an enlarged illustration. The header 50 has an opening 51 in the bottom region 52 of the bottom, the opening having lateral rounded short end regions 53 which are configured as inwardly directed rim holes. In this context, lateral means that it is arranged on the narrow side. Moreover, rim holes 54 which are directed outwardly are formed so as to lie opposite on the long sides of the openings. The rim holes 54 have in turn reduced portions or indentations 55 which are provided both centrally and in the end regions of the rim holes 54. The rim holes also have bevels 56 which serve as insertion bevels for the introduction of the flat tubes into the opening 51. The insertion bevels are arranged on those inner sides of the rim holes 54 which lie opposite one another. The reduced portions 55 serve to position the plate and top plate which are placed onto the flat tubes.

Figure 5:
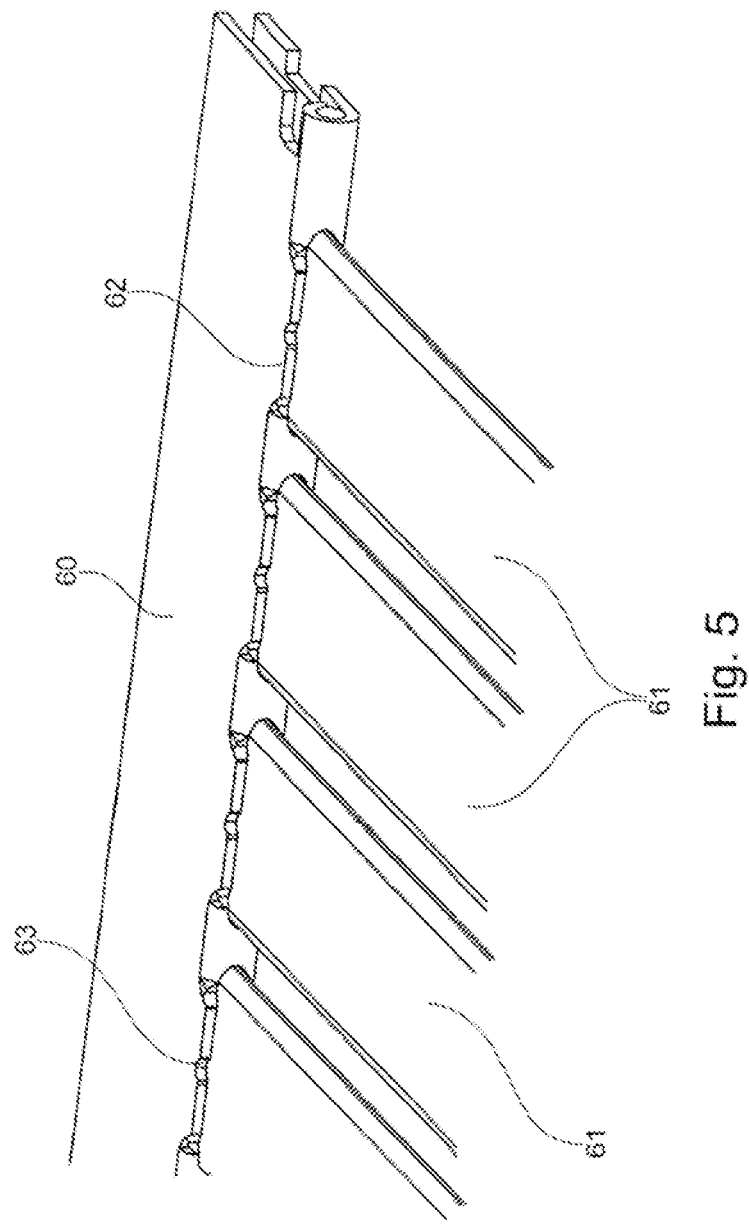
FIG. 5 shows a view of a header with flat tubes.

FIG. 5 shows a header 60 with flat tubes 61 which are introduced into openings and are arranged spaced apart from one another. In the region of the openings, the flat tubes come into contact with the inwardly directed rim holes, see designation 53 of FIG. 4, and with the outwardly directed rim holes 62. Furthermore, the constrictions 63 of the rim holes 62 can be seen.

Figure 6:
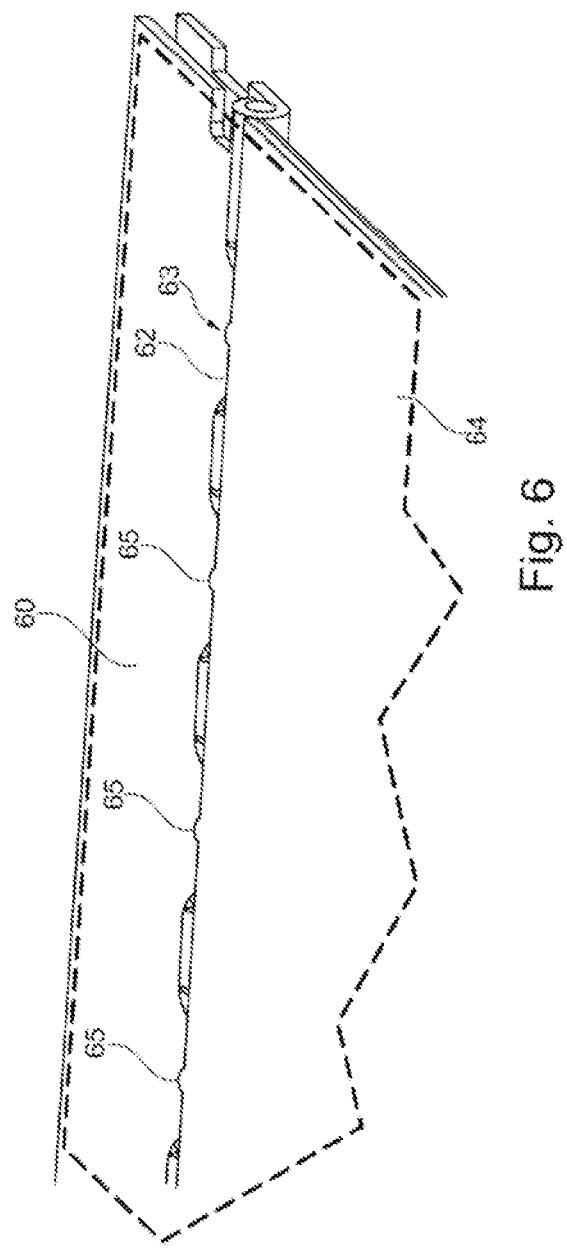
FIG. 6 shows a view of a header with flat tubes.

FIG. 6 shows a detail of a heat exchanger in the arrangement of FIG. 5 with a top plate 64 which is placed onto the flat tubes 61. Here, on its edge which is adjacent to the header 60, the top plate 64 has projections 65 which engage into the indentations 63 of the header. As a result, a positively locking connection with the header 60 is achieved, with the result that exact positioning between the header 60 and the top plate 64 is achieved.

The invention claimed is:

1. A heat exchanger for controlling the temperature of batteries or electronics comprising:
   at least one header with a bottom and a top,
   a plurality of flat tubes comprising flat sides, and
   a plate,
   wherein the bottom comprises openings, wherein the openings each receive a tube end of one of the plurality of flat tubes such that each tube end is in fluidic communication with the at least one header,
   wherein the bottom of the at least one header is formed from a U-shaped element having two parallel limbs and a bottom region which connects the limbs, wherein the openings are arranged in the bottom region, wherein the top comprises a wall region arranged between the limbs,
   wherein the height of the openings perpendicularly with respect to the plane of the limbs corresponds substantially to the spacing of the limbs on their inner side,
   wherein the limbs have a solder plating which is applied on the surface of the inner side of the limbs,
   wherein each of the openings comprises two lateral rounded regions on two narrow sides and two long sides connecting the lateral rounded regions, wherein the lateral rounded regions each comprise an inwardly directed rim hole wall, wherein the long sides each comprise an outwardly directed rim hole wall having ends and a center,
   wherein the plurality of flat tubes are arranged next to one another, and the plate is placed onto the flat sides of the flat tubes and is connected to the flat tubes, wherein the outwardly directed rim hole wall comprises indentations arranged at the ends and at the center, wherein the plate comprises bulges that are accommodated in the indentations of the outwardly directed rim hole wall.

2. The heat exchanger according to claim 1, wherein the tube end is soldered to the two parallel limbs.

3. The heat exchanger according to claim 1, wherein the top is formed by a solid metal part.

4. The heat exchanger according to claim 1, wherein the plurality of tubes are formed as flat tubes with flat sides, the extent of the tubes in a plane parallel to the plane of the limbs of the bottom being greater than in the plane which is perpendicular with respect thereto.

5. The heat exchanger according to claim 1, wherein the extent of the plate in a direction perpendicular with respect to the plane of the limbs corresponds substantially to the extent of the limbs in said direction.

6. The heat exchanger according to claim 3, wherein the top is rectangular or round in cross section.

7. The heat exchanger according to claim 4, wherein the extent of the tubes in a plane parallel to the plane of the limbs of the bottom is from three to twelve times greater than in the plane which is perpendicular with respect thereto.

8. A heat exchanger for controlling the temperature of batteries or electronics comprising:
    at least one header with a bottom and a top,
    a plurality of flat tubes comprising flat sides, and
    a plate,
    wherein the bottom comprises openings, wherein the openings each receive a tube end of one of the plurality of flat tubes such that each tube end is in fluidic communication with the at least one header,
    wherein the bottom of the at least one header is formed from a U-shaped element having two parallel limbs and a bottom region which connects the limbs, wherein the openings are arranged in the bottom region, wherein the top comprises a wall region arranged between the limbs,
    wherein the height of the openings perpendicularly with respect to the plane of the limbs corresponds substantially to the spacing of the limbs on their inner side, wherein the limbs have a solder plating which is applied on the surface of the inner side of the limbs,
    wherein each of the openings comprises two lateral rounded regions on two narrow sides and two long sides connecting the lateral rounded regions, wherein the lateral rounded regions each comprise an inwardly directed rim hole wall, wherein the long sides each comprise an outwardly directed rim hole wall having ends and a center,
    wherein the plurality of flat tubes are arranged next to one another, and the plate is placed onto the flat sides of the flat tubes and is connected to the flat tubes,
    wherein the outwardly directed rim hole wall comprises bulges arranged at the ends and at the center, wherein the plate comprises indentations that accommodate the bulges of the outwardly directed rim hole wall.

9. The heat exchanger according to claim 8, wherein the tube end is soldered to the two parallel limbs.

10. The heat exchanger according to claim 8, wherein the top is formed by a solid metal part.

11. The heat exchanger according to claim 8, wherein the plurality of tubes are formed as flat tubes with flat sides, the extent of the tubes in a plane parallel to the plane of the limbs of the bottom being greater than in the plane which is perpendicular with respect thereto.

12. The heat exchanger according to claim 8, wherein the extent of the plate in a direction perpendicular with respect to the plane of the limbs corresponds substantially to the extent of the limbs in said direction.

13. The heat exchanger according to claim 10, wherein the top is rectangular or round in cross section.

14. The heat exchanger according to claim 11, wherein the extent of the tubes in a plane parallel to the plane of the limbs of the bottom is from three to twelve times greater than in the plane which is perpendicular with respect thereto.

* * * * *